(12) United States Patent
Liu et al.

(10) Patent No.: US 11,161,746 B2
(45) Date of Patent: Nov. 2, 2021

(54) PREPARATION OF MOLECULAR SIEVE AND TREATMENT OF SILICON-CONTAINING WASTEWATER THEREFROM

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Zhongqing Liu, Beijing (CN); Yibin Luo, Beijing (CN); Lina Zhou, Beijing (CN); Xingtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 623 days.

(21) Appl. No.: 15/772,285

(22) PCT Filed: Oct. 28, 2016

(86) PCT No.: PCT/CN2016/000592
§ 371 (c)(1),
(2) Date: Apr. 30, 2018

(87) PCT Pub. No.: WO2017/071115
PCT Pub. Date: May 4, 2017

(65) Prior Publication Data
US 2018/0312415 A1    Nov. 1, 2018

(30) Foreign Application Priority Data

Oct. 30, 2015    (CN) .......................... 201510725653.0

(51) Int. Cl.
*C01B 33/12* (2006.01)
*C01B 39/00* (2006.01)

(52) U.S. Cl.
CPC .............. *C01B 33/12* (2013.01); *C01B 39/00* (2013.01); *Y02A 20/124* (2018.01)

(58) Field of Classification Search
CPC combination set(s) only.
See application file for complete search history.

(56) References Cited

U.S. PATENT DOCUMENTS 3,702,886 A * 11/1972 Argauer .................. C01B 39/40
423/705
4,222,995 A     9/1980 Roebke et al.
(Continued)

FOREIGN PATENT DOCUMENTS

CN     1167082 A    12/1997
CN     1239015 A    12/1999
(Continued)

OTHER PUBLICATIONS

Machine Translation of CN104030499A from Espacenet, pp. 1-12 (Year: 2014).*
(Continued)

*Primary Examiner* — Chester T Barry
(74) *Attorney, Agent, or Firm* — Novick, Kim & Lee, PLLC; Allen Xue

(57) ABSTRACT

A method for the treatment of silicon-containing wastewater from the preparation of a molecular sieve or a catalyst includes the step of contacting the silicon-containing wastewater with at least one acid or at least one alkali, so that at least a part of the silicon elements in the silicon-containing wastewater form a colloid. A mixture containing a colloid is thus obtained. A silicon-containing solid phase and a first liquid phase are produced by a solid-liquid separation. A
(Continued)

solid phase and a second liquid phase are produced by a solid-liquid separation after at least a part of the metal elements in the first liquid phase form a precipitate. At least a part of the second liquid phase is subjected to electrodialysis to produce an acid liquor and/or an alkali liquor. The silicon-containing solid phase can be used as the raw material for a molecular sieve synthesis.

26 Claims, 3 Drawing Sheets

(56) References Cited

U.S. PATENT DOCUMENTS

| | | | | |
|---|---|---|---|---|
| 4,257,885 | A | * | 3/1981 | Grose .................. C02F 1/281 |
| | | | | 423/709 |
| 4,310,496 | A | | 1/1982 | Achenbach et al. |
| 5,968,326 | A | * | 10/1999 | Yelon .................. B01D 61/445 |
| | | | | 204/192.1 |
| 2008/0035577 | A1 | * | 2/2008 | Brook-Levinson ....... C02F 9/00 |
| | | | | 210/667 |
| 2008/0171118 | A1 | * | 7/2008 | Bazinet .................. A23C 9/144 |
| | | | | 426/417 |
| 2008/0253959 | A1 | | 10/2008 | Johnson et al. |
| 2008/0272001 | A1 | * | 11/2008 | Zhang .................. B01D 61/46 |
| | | | | 204/450 |
| 2014/0102649 | A1 | * | 4/2014 | Esser .................. D21H 21/18 |
| | | | | 162/76 |
| 2018/0312415 | A1 | * | 11/2018 | Liu .......................... C01B 39/00 |

FOREIGN PATENT DOCUMENTS

| | | | |
|---|---|---|---|
| CN | 1239016 | A | 12/1999 |
| CN | 1426962 | A | 7/2003 |
| CN | 1453220 | A | 11/2003 |
| CN | 1958471 | A | 5/2007 |
| CN | 101407350 | B * | 9/2010 |
| CN | 103071389 | A * | 5/2013 |
| CN | 103359848 | A | 10/2013 |
| CN | 103771434 | A | 7/2014 |
| CN | 104030499 | A * | 9/2014 |
| CN | 104030499 | A | 9/2014 |
| CN | 104370293 | A | 2/2015 |
| CN | 104445755 | A * | 3/2015 |
| CN | 104649494 | A | 5/2015 |
| CN | 105540943 | A | 5/2016 |
| JP | 2006212526 | A | 8/2006 |
| RU | 2558581 | C1 | 8/2015 |

OTHER PUBLICATIONS

Feihua Jiang, "Study on NaY Molecular Sieve Silicone Wastewater Recycling Process" Guangzhou Chemical Industry, Nov. 2013, vol. 41, No. 21, pp. 131-132 (English translation, 2021) (Year: 2021).*

Szostak, R., "Molecular Sieves: Principles of Synthesis and Identification," Van Nostrand Reinhold Catalysis Series, Springer Science+ Business Media, LLC (1989), 524p. (Year: 1989).*

Feihua Jiang, "Study on NaY Molecular Sieve Silicon Wastewater Recycling Process", Guangzhou Chemical Industry, Nov. 2013, vol. 41, No. 21, pp. 131-132.

European Patent Office; Extended European Search Report; Application No. EP16858566; dated Dec. 4, 2019.

* cited by examiner

PREPARATION OF MOLECULAR SIEVE AND TREATMENT OF SILICON-CONTAINING WASTEWATER THEREFROM

TECHNICAL FIELD

The present invention relates to a field of wastewater treatment, in particular to a treatment of wastewater produced from the preparation of a molecular sieve or catalyst. Specifically, the present invention relates to a method for treating the silicon-containing wastewater produced from the preparation of a molecular sieve or catalyst and a comprehensive utilization method. The present invention further relates a method for preparing a molecular sieve, and the present invention also relates to a preparation system of a molecular sieve.

BACKGROUND OF THE TECHNOLOGY

Molecular sieves are widely used as catalytic materials, adsorption and separation materials and ion exchange materials for their structural characteristics of high specific surface area, good thermal stability, good water stability and uniform pore size, and in the field of petrochemical industry molecular sieves find wide uses. In general, it is necessary to wash crystallization products to remove the silicate/aluminosilicate salts remained on the internal and external surfaces thereof after the crystallization process is completed. Silicon-containing wastewater is thus produced. In addition, artificially synthesized molecular sieves generally need to be converted into hydrogen or multivalent metal ionic molecular sieves through an ion exchange, so that they can be used as active components of an acid catalyst. Wastewater containing salt, silicon/silicon-aluminum materials can also be produced. Such wastewater cannot be discharged directly due to the high amount of suspended matters.

The following process is adopted by Jiang Feihua (Study on Silicon-Containing Wastewater Recycling Process of NaY Molecular Sieve, *Guangzhou Chemical Industry*, 41(21):131-132, 2013) for treating the wastewater produced from the preparation of NaY molecular sieve: the crystallization mother liquid and the primary filtrate having a high content of $SiO_2$ and $Na_2O$ are firstly subjected to a sedimentation separation; then the supernatant is neutralized with aluminum sulfate to form a colloid, i.e., aluminosilica colloid which is used for synthesizing the NaY molecular sieve. At the same time, the bottom concentrated liquor produced from the sedimentation is delivered into the secondary phase of a belt filter for filtration in order to further recover the molecular sieve;

the secondary filtrate having a relatively low $SiO_2$ content cannot be directly recycled for the preparation of aluminosilica colloids due to the low $SiO_2$ concentration. Therefore, a sedimentation tank is used for a cascade sedimentation. When the suspended matters are reduced to a certain level, the supernatant is recycled to the crystallizing tank as the water for crystallization termination, cooling and alkalinity reduction in the crystallization tank in in place of fresh chemical water. The thick liquid at the bottom of the sedimentation tank together the thick liquid at the tank bottom for the sedimentation of the primary filtrate are delivered to the secondary phase of a belt filter and recycled to achieve the recycling of $SiO_2$ filtrate which has a low concentration.

Although the method saves chemical water and decreases the discharging of sewage with an improved utilization of silicon to some extent, the method does not recover the silicon in the secondary filtrate. But the secondary filtrate is used as the water for crystallization termination, cooling and alkalinity reduction in the crystallization tank after the sedimentation and the separation of the suspended matters, as still results in wasting of the silicon resource.

For the recovery of silicon in the wastewater containing $SiO_2$ from the preparation of molecular sieves, the existing methods usually employs a neutralization of aluminum to a colloid together with the use of a flocculant for facilitating the filtration.

For example, CN103359848A discloses a method for the treatment of silicon-containing washing wastewater from the preparation of a Na molecular sieve, comprising the following steps:

(1) the silica-containing washing wastewater of the Na molecular sieve is neutralized with an acidified aluminum salt solution until the pH is 6-10 and a alumina-silica gel is formed;

(2) a flocculant or a flocculant and a filter aid are added into the above gel for flocculation and sedimentation;

(3) the gel obtained in step (2) is filtered and washed. The filtration residue is recycled while the filtrate is discharged directly.

In another example, CN1453220A discloses a recycling method of the washing water of a Y molecular sieve. The method comprises the following steps:

(1) cationic polyacrylamide or anionic polyacrylamide in an amount of 5-20 ppm, preferably 8-15 ppm is added into the washing water for the molecular sieve exchange and stirred for at least 2 minutes; then the polymerized $AlCl_3$ in an amount of 1-10 ppm, preferably 2-8 ppm is added. Keep stirring until a clear liquid and a solid precipitate are formed;

(2) a depth filter or other common filters in the art are used for separating the above clear liquid and the solid precipitate. The selected depth filter is filled with quartz sand and/or slag having a particle size of 0.7-2.0 mm, preferably 0.8-1.5 mm and a bed height of 300-1000 mm, preferably 400-900 mm as fillers. A clear liquid having a turbidity of 10-20 can be obtained after the clear liquid and the solid precipitate from step (1) are filtered by a depth filter;

(3) the clear liquid from step (2) passes through a cation exchange column filled with a cation exchange resin. The $Na^+$ in the clear liquid exchanges with the $H^+$ on the ion exchange resin so that the content of $Na^+$ in the clear liquid is reduced to 0.1-0.6 wt. %;

(4) the clear liquid from step (3) is formulated into a molecular sieve exchange solution for recycling.

However, as a flocculant is a must in the recovery of silicon element in the washing wastewater containing silicon in the above method, the recovered silicon also contains the flocculant. Therefore, the recycled silicon may have an adverse effect on the quality of the molecular sieve when being reused in the preparation of the molecular sieve. Moreover, the practical operation shows that the recovery rate of silicon in the above method still needs to be further improved. Furthermore, the above methods only realize a partial reuse of the silicon-containing washing wastewater, and a certain amount of effluent is still produced.

Contents of the Invention

The object of the present invention is to overcome the deficiencies of the existing recovery and recycling of the wastewater from the preparation of a molecular sieve, and provide a treatment method for silicon-containing wastewater. By the treatment method, a higher silicon recovery rate and a higher wastewater utilization rate can be reached in the treatment of the wastewater produced from the preparation process of a molecular sieve, particularly the crystallization wastewater, the washing wastewater and/or the ion exchange wastewater with a relatively high silicon content.

According to the first aspect of the present invention, the invention provides a treatment method for silicon-containing wastewater, wherein the silicon-containing wastewater comes from the preparation of a molecular sieve or a catalyst, comprising the following steps:

Step (1): the silicon-containing wastewater is contacted with at least one acid or at least one alkali, so that at least a part of the silicon elements in the silicon-containing wastewater form a colloid, and a mixture containing a colloid is obtained;

Steps (2): the mixture containing a colloid as obtained in step (1) is subjected to a solid-liquid separation to produce a silicon-containing solid phase and a first liquid phase;

Step (3): the pH value of the first liquid phase is regulated to 8 or more, and $CO_3^{2-}$ and/or $Ca^{2+}$ are introduced into the first liquid phase so that at least a part of the metal elements in the first liquid phase form a precipitate;

Steps (4): the mixture as obtained by step (3) is subjected to a solid-liquid separation to produce a solid phase and a second liquid phase;

Step (5): at least a part of the second liquid phase is subjected to an electrodialysis treatment to produce an acid liquor and/or alkali liquor.

According to the second aspect of the invention, the present invention provides a method for the utilization of silicon-containing wastewater, wherein the silicon-containing wastewater comes from the preparation of a molecular sieve or a catalyst. The method comprises the treatment of the silicon-containing wastewater by using the method according to the first aspect of the present invention.

In the above, the silicon-containing solid phase as obtained in step (2) is recycled as the raw material for a molecular sieve synthesis;

at least a part of the second liquid phase as obtained in step (4) is recycled as the washing water for the washing process of the molecular sieve;

the acid liquor as obtained in step (5) is recycled as the ion exchange liquid in the ion exchange process of the molecular sieve; the alkali liquor as obtained in step (5) is recycled as the alkali source in the molecular sieve synthesis.

Preferably, step (5) further produces desalted water which is recycled as the washing water in the synthesis of the molecular sieve and/or the washing process of the molecular sieve.

According to the third aspect of the invention, the present invention provides a method for the preparation of a molecular sieve, comprising a synthesis step, a crystallization step, a separation step, a washing step, a wastewater recovery and recycling step, and an optional ion exchange step.

In the synthesis step, a silicon source and an alkali source as well as an optional aluminum source and an optional titanium source are contacted in water for reaction;

in the crystallization step, the mixture as obtained from the synthesis step is crystallized;

in the separation step, the mixture obtained from the crystallization step is subjected to a solid-liquid separation to produce a solid phase and a liquid phase;

in the washing step, the solid phase as obtained from the separation step is washed with washing water to obtain a molecular sieve and washing wastewater;

in the ion exchange process, the molecular sieve is contacted with an ion exchange liquid for carrying out ion exchange and thereafter the solid-liquid separation is carried out to produce an ion exchanged molecular sieve and an ion exchange waste liquid;

in the wastewater recovery and recycling step, wastewater is collected and treated by using the method according to the first aspect of the invention. The wastewater is the liquid phase in the separation step, the washing wastewater in the washing step, and the ion exchange waste liquid in the ion exchange step.

According to the fourth aspect of the invention, the present invention provides a molecular sieve preparation system, comprising a synthesis unit, a crystallization unit, a separation unit, a washing unit, a wastewater recovery and recycling unit, and an optional ion exchange unit.

The synthesis unit is used for contacting a silicon source and an alkali source as well as an optional aluminum source and an optional titanium source in water for reaction;

the crystallization unit is used for crystallizing the mixture from the synthesis unit;

the separation unit is used for carrying out a solid-liquid separation on the mixture as obtained from the crystallization unit to produce a liquid phase and a solid phase; the produced liquid phase is delivered into the wastewater recovery and recycling unit as wastewater;

in the washing unit, the solid phase as obtained from the separation unit is washed with a washing water to produce a molecular sieve and washing wastewater; the washing wastewater is delivered into the wastewater recovery and recycling unit as wastewater;

the ion exchange unit is used for contacting the molecular sieve as obtained from the washing unit with the ion exchange liquid to carry out an ion exchange, from which an ion exchanged molecular sieve and an ion exchange waste liquid are obtained; the ion exchange waste liquid is delivered into the wastewater recovery and recycling unit;

the said wastewater recovery and recycling unit is used for treating wastewater; the said wastewater recovery and recycling unit includes a first precipitation reaction unit, a first solid-liquid separation unit, a second precipitation reaction unit, a second solid-liquid separation unit and an electrodialysis unit;

the first precipitation reaction unit is used for contacting the wastewater with at least one acid or at least one alkali so that the silicon in the wastewater forms a colloid; a mixture containing a colloid is thus obtained;

the first solid-liquid separation unit is used for carrying out a solid-liquid separation on the mixture containing a colloid as obtained from the first precipitation reaction unit; a silicon-containing solid phase and a first liquid phase are thus obtained;

the second precipitation reaction unit is used for regulating the pH value of the first liquid phase to 8 or more and introducing $CO_3^{2-}$ and/or $Ca^{2+}$ into the first liquid phase so that at least a part of the metal elements in the first liquid phase form a precipitate;

the second solid-liquid separation unit is used for carrying out a solid-liquid separation on the mixture as obtained from the second precipitation reaction unit to obtain a solid phase and a second liquid phase;

the electrodialysis unit is used to carrying out an electrodialysis treatment, preferably a bipolar membrane electrodialysis treatment, more preferably a treatment of a common electrodialysis and a bipolar membrane electrodialysis in series, on at least a part of the second liquid phase to produce an acid liquor and/or alkali liquor.

By the method of the present invention, a higher silicon recovery rate can be reached in the treatment of the silicon-containing wastewater produced from the preparation process of a silicon-containing molecular sieve or a catalyst, particularly the wastewater having a relatively high silicon content (such as washing wastewater and ion exchange waste liquid), even without a dependence on a flocculant. In the meanwhile, the method of the present invention can achieve a higher wastewater utilization rate, and basically no wastewater or an extremely low volume of wastewater is discharged. In the meanwhile, the discharged solid wastes are in a very low amount.

BRIEF DESCRIPTION OF THE DRAWINGS

The drawings which are provided for a further understanding of the invention constitute a part of the specification. The drawings are used to explain the present invention together with the following specific embodiments but do not constitute restrictions on the invention.

DESCRIPTION OF THE REFERENCE SIGNS

Figure 1:
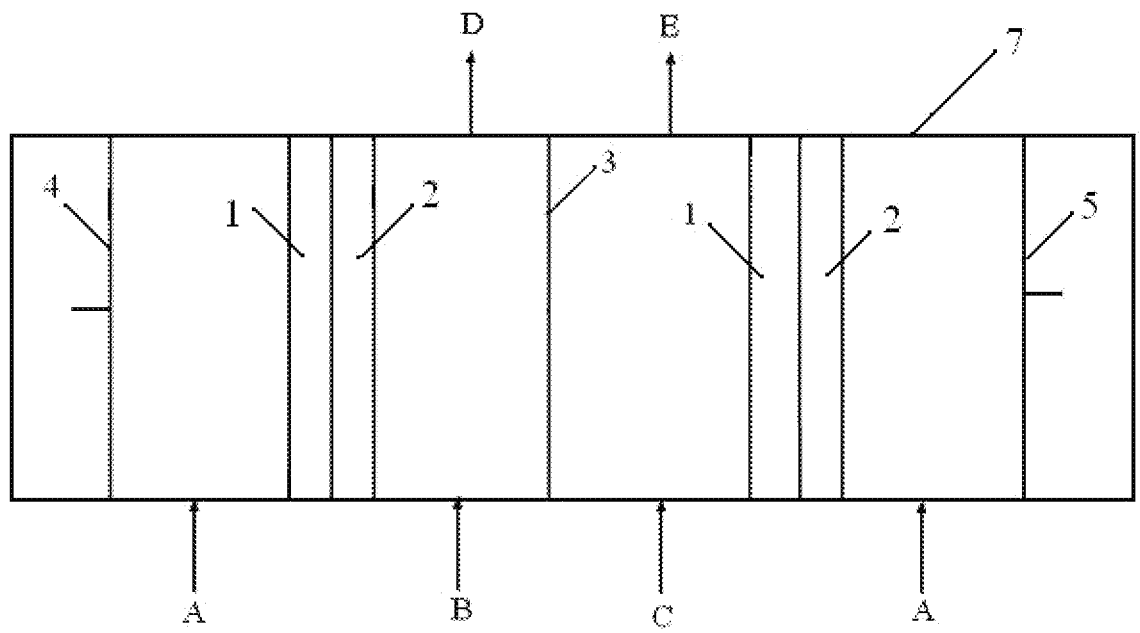
FIG. 1 is an embodiment of the treatment of the second liquid phase by using a dual-chamber bipolar membrane electrodialysis.

1: anion exchange layer of the bipolar membrane
2: cation exchange layer of the bipolar membrane
3: cation exchange membrane
4: positive electrode
5: negative electrode
6: anion exchange membrane
A: aqueous electrolyte solution
B: the second liquid phase
C: water
D: acid liquor
E: alkali liquor
F: desalted water

SPECIFIC EMBODIMENTS

According to the first aspect of the present invention, the present invention provides a treatment method for silicon-containing wastewater, comprising step (1): the silicon-containing wastewater is contacted with at least one acid or at least one alkali so that at least a part of the silicon elements in the silicon-containing wastewater form a colloid. A mixture containing a colloid is thus obtained.

The said silicon-containing wastewater comes from the preparation of a molecular sieve or a catalyst. The said molecular sieve can be various kinds of common silicon-containing molecular sieves, such as a Y molecular sieve, X molecular sieve, A molecular sieve, MCM molecular sieve, ZSM molecular sieve (such as ZHP molecular sieve), a mordenite molecular sieve, a beta molecular sieve and a titanium silicalite molecular sieve. The catalyst can be an FCC catalyst The silicon-containing wastewater can be the crystallization mother liquid, the washing wastewater produced in the washing step, the ion exchange waste liquid produced in the ion exchange process or a mixture of two or more of the above in the preparation of a molecular sieve or a catalyst. It can also be the exchange waste liquid and/or the washing waste liquid in the preparation of an FCC catalyst. The method of the present invention is especially suitable for treating a silicon-containing waste liquid with a relatively high silicon content, for example, treating the silicon-containing waste liquid with a content of silicon element of 10 mg/L or more (such as 10-15000 mg/L), preferably 50 mg/L or more, and particularly preferably the silicon-containing waste liquid with a content of silicon element of 100 mg/L or more. The silicon-containing waste liquid with a relatively high silicon content can specifically be a crystallization mother liquid produced in crystallization, washing wastewater produced in the washing step, an ion exchange waste liquid produced in ion exchange process or a mixture of two or more of the above, and a washing waste liquid from the preparation of a catalyst.

The acid and the alkali are used for precipitating the silicon element in the silicon-containing wastewater by forming a colloid. The prior art shows that the silicon colloid obtained by using a conventional method is a material difficult to be filtered. In case of the filtration using a plate and frame filter, a phenomenon such as a penetrating filtration or a filter cloth blockage easily happens. Therefore, a flocculant and/or a filter aid is often used. However, compared with the use of acidified aluminum sulfate, $AlCl_3$ and polyaluminum chloride, on the one hand, the use of acid or alkali in the present invention can enable the silicon colloid as formed to possess a better filtration performance so that the need for the flocculant and the filter aid is omitted. Moreover, since the product is mainly a silicon colloid, it is convenient to recover and recycle the product. On the other hand, it can also reach a higher silicon precipitation rate, and thereby achieves a higher silicon recovery rate.

The acid is preferably an inorganic acid. The specific examples may include but are not limited to hydrochloric acid, sulfuric acid, nitric acid and phosphoric acid. Preferably, the acid is sulfuric acid and/or hydrochloric acid. The acid is provided in the form of an aqueous solution, the concentration of which is not particularly limited. It can be a conventional concentration according to the specific kind of acid, preferably 0.5-20 wt. %, more preferably 1-10 wt. %, and even more preferably 2-5 wt. %.

The alkali is preferably an inorganic alkali, more preferably selected from alkali hydroxide and ammonia water, and even preferably selected from sodium hydroxide, potassium hydroxide and ammonia water, and most preferably sodium hydroxide. The alkali is preferably provided in the form of an aqueous solution, the concentration of which is not particularly limited. It can be a conventional concentration according to the specific kind of the alkali.

The specific amounts of the acid and the alkali can be selected according to the kind of acid and alkali and the properties of the silicon-containing wastewater to meet the requirement of the formation of a colloid by the silicon in the silicon-containing wastewater. In general, the amount of the acid or the alkali keeps the pH value of the silicon-containing wastewater within the range of 2-9, preferably within the range of 3-9, more preferably within the range of 3-6.9. Preferably, the silicon-containing wastewater is contacted with at least one acid, wherein the amount of the said acid keeps the pH value of the silicon-containing wastewater within the range of 4-7.5, preferably within the range of 5-6.9. In addition, the specific range of the pH value can further be optimized according to the specific source of the silicon-containing wastewater. In one embodiment, the silicon-containing wastewater comes from the preparation of a Y molecular sieve, wherein the amount of the said acid or alkali preferably keeps the pH value of the silicon-containing wastewater within the range of 6.5-7.5. In another embodiment, the silicon-containing wastewater comes from the preparation of a ZSM molecular sieve, wherein the amount of the said acid or alkali preferably keeps the pH value of the silicon-containing wastewater within the range of 4.5-7. In another embodiment, the silicon-containing wastewater comes from the preparation of a titanium silicalite molecular sieve, wherein the amount of the said acid or alkali preferably keeps the pH value of the silicon-containing wastewater within the range of 6-7.

The silicon-containing wastewater may be contacted with at least one acid or at least one alkali at a temperature of 10-60° C., preferably 40-50° C., with the requirement that the contact period is sufficient for most of the silicon in the silicon-containing wastewater to form a colloid. Generally, the contact period can be 0.5-8 hours, preferably 3-5 hours. For further improving the filtration performance and further improving the removal rate of silicon, the mixture produced from the above contact is preferably aged after the contact of the silicon-containing wastewater with acid or alkali is completed. The aging can be carried out at a temperature of 0-95° C., preferably 40-85° C. The period for the said aging may be 5-24 hours.

The treatment method for the silicon-containing wastewater according to the present invention comprises step (2): the mixture containing a colloid produced in step (1) is subjected to a solid-liquid separation to produce a silicon-containing solid phase and a first liquid phase.

In step (2), the mixture containing a colloid produced in step (1) can be separated by using a conventional solid-liquid separation method, such as filtration, centrifugation or a combination of two or more separation methods. Preferably a filtration method is used for separating the mixture containing a colloid produced in step (1). A variety of common filter media can be used in the filtration, for example, one selected from a fabric, a porous material, a solid particle layer and a porous membrane, or a combination of two or more of the above. Said porous membrane can be an organic membrane, an inorganic membrane or a combination of two or more kinds of porous membranes. Said inorganic membrane can be a ceramic membrane and/or a metal membrane; the organic membrane can be a hollow fiber membrane. Preferably, a fabric can be used as the filter medium. The filtration can be carried out in a common filtration device, such as a plate and frame filter and a belt filter.

Generally, the water content of the silicon-containing solid phase as obtained under the said solid-liquid separation conditions is less than 45 wt. %, for example 30-40 wt. %. The solid-liquid separation can be carried out at the ambient temperature or also under heating conditions. Generally, the solid-liquid separation can be carried out at a temperature of 20-80° C., preferably at the ambient temperature (i.e., 15-40° C.). The period of the solid-liquid separation can be selected according to the solid-liquid separation modes, without any specific limitation.

The silicon-containing solid phase as obtained from the solid-liquid separation of the mixture containing a colloid produced in step (1) can serve as the silicon source for the synthesis of a silicon-containing molecular sieve.

The treatment method for the silicon-containing wastewater according to the present invention comprises step (3): the pH value of the first liquid phase is regulated to 8 or more; $CO_3^{2-}$ and/or $Ca^{2+}$ is optionally introduced into the first liquid phase so that at least a part of the metal elements in the first liquid phase forms a precipitate;

$CO_3^{2-}$ can be introduced into the first liquid phase by adding a water-soluble carbonate into the first liquid phase. "Water-soluble" means that the solubility in water is 1 g or more. Said water-soluble carbonate are preferably selected from the alkali salts and ammonium salts of carbonic acid. More preferably, the water-soluble carbonate is selected from sodium carbonate, potassium carbonate and ammonium carbonate. Even preferably, the water-soluble carbonate is sodium carbonate.

The object of introducing $CO_3^{2-}$ into the first liquid phase is to make the calcium and magnesium ions in the first liquid phase form a precipitate, and thereby reduce the hardness of the first liquid phase. The introduction amount of $CO_3^{2-}$ can be selected according to the content of metal elements in the first liquid phase. In general, the amount of $CO_3^{2-}$ introduced into the first liquid phase can be 0.1-20 mmol/L, preferably 1-15 mmol/L.

When the first liquid phase further comprises silicon element, $Ca^{2+}$ is preferably introduced into the first liquid phase so that the silicon in the first liquid phase and calcium form calcium silicate which precipitates from the first liquid phase. Generally, $Ca^{2+}$ is introduced into the first liquid phase when the content of Si in the first liquid phase is 50 mg/L or more, preferably 80-150 mg/L. The introduction amount of $Ca^{2+}$ is determined by the content of Si in the first liquid phase. In general, the amount of $Ca^{2+}$ introduced into the first liquid phase can be 0.1-10 mmol/L, preferably 1-5 mmol/L.

The introduction of $Ca^{2+}$ can be achieved by adding one or more of calcium sulfate, calcium chloride, calcium hydroxide and calcium oxide into the first liquid phase.

In step (3), the pH value of the first liquid phase is generally regulated to 8 or more, more preferably 9 or more (for example, 9-12), even preferably 10.5-11.5, which is thus beneficial to the precipitation of metal ions in the first liquid phase. The pH value of the first liquid phase can be regulated by adding at least one alkali to the first liquid phase. The alkali can be selected from alkali hydroxide, alkali earth hydroxide and ammonia water, preferably from sodium hydroxide, potassium hydroxide, calcium hydroxide and ammonia water, more preferably sodium hydroxide. The alkali is preferably provided in the form of an aqueous solution, the concentration of which is not particularly limited. It can be a conventional concentration according to the specific kind of the alkali.

The object of the step (3) is mainly to reduce the content of calcium and magnesium ions, silicon element and other metal ions that can form precipitates in the wastewater. A person skilled in the art can understand that it is possible to omit step (3) when the content of the above ions in the wastewater is low or the wastewater is free of the above elements.

The treatment method for the silicon-containing wastewater according to the present invention comprises step (4): a solid phase and a second liquid phase are obtained from the solid-liquid separation of the mixture produced from step (3).

In step (4), a conventional solid-liquid separation method can be used to separate the mixture obtained in step (3), such as filtration, centrifugation or a combination of two or more above separation methods. Preferably, the mixture obtained in step (3) is separated by a filtration method. A variety of common filter media can be used in the filtration, for example, one selected from a fabric, a porous material, a solid particle layer and a porous membrane or a combination of two or more of the above. Said porous membrane can be an organic membrane, an inorganic membrane or a combination of the above two. Said inorganic membrane can be a ceramic membrane and/or a metal membrane; the organic membrane can be a hollow fiber membrane. Preferably, a porous membrane is used as the filter medium.

In step (4), the said solid-liquid separation conditions generally make the water content of the solid phase as produced 20 wt. % or less. The solid-liquid separation can be carried out at the ambient temperature or also under heating conditions, preferably at the ambient temperature.

The solid phase obtained in step (4) can be discharged out. The second liquid phase obtained in step (4) has a low ion content and can be used as the washing water for the preparation of a molecular sieve. The second liquid phase can also be further treated.

The step (4) is used for carrying out a solid-liquid separation on the mixture obtained from the step (3). A person skilled in the art can understand that the present method does not comprise step (4) correspondingly when step (3) is not comprised.

The treatment method for the silicon-containing wastewater according to the present invention comprises step (5): at least a part of the second liquid phase is subjected to an electrodialysis to produce an acid liquor, an alkali liquor and/or desalted water. An acid liquor, an alkali liquor and/or desalted water can be produced by an electrodialysis of the second liquid phase. Therein the acid liquor can be used in the molecular sieve exchange process, for example, the acid liquor can ionically exchange with a non-hydrogen molecular sieve as an ion exchange liquid to produce a hydrogen molecular sieve. The alkali liquor can be used as the alkali in the synthesis process of a molecular sieve.

The electrodialysis method is not particularly limited in the present invention. It can be a bipolar membrane electrodialysis or a combination of a bipolar membrane electrodialysis and a common electrodialysis.

The bipolar membrane electrodialysis can be a dual-chamber bipolar membrane electrodialysis or a triple-chamber bipolar membrane electrodialysis. The membrane stack used in the said dual-chamber bipolar membrane electrodialysis can be composed of a bipolar membrane and a cation exchange membrane or an anion exchange membrane. The membrane stack used in the said triple-chamber bipolar membrane electrodialysis can be composed of a bipolar membrane, a cation exchange membrane and an anion exchange membrane.

Specifically, the membrane stack of the dual-chamber bipolar membrane electrodialysis can be composed of at least two bipolar membranes and at least one cation exchange membrane, and the bipolar membranes and the cation exchange membrane are alternately arranged. In the practical operation, as shown in FIG. 1, at least two bipolar membranes and at least one cation exchange membrane 3 are arranged between the positive electrode 4 and the negative electrode 5, and the bipolar membranes and the cation exchange membrane 3 are alternately arranged; the second liquid phase B enters the acid chamber between the cation exchange layer 2 of the bipolar membranes and the cation exchange membrane 3; water C enters the alkali chamber between the anion exchange layer 1 of the bipolar membranes and the cation exchange membrane 3; the aqueous electrolyte solution A is filled into the electrode chamber between the positive electrode 4 and the anion exchange layer 1 of the bipolar membranes and the electrode chamber between the negative electrode 5 and the cation exchange layer 2 of the bipolar membranes; a direct current is applied between the positive electrode 4 and the negative electrode 5 for an electrodialysis treatment. Thus, the acid liquor D is obtained in the acid chamber and the alkali liquor E is obtained in the alkali chamber.

Figure 2:
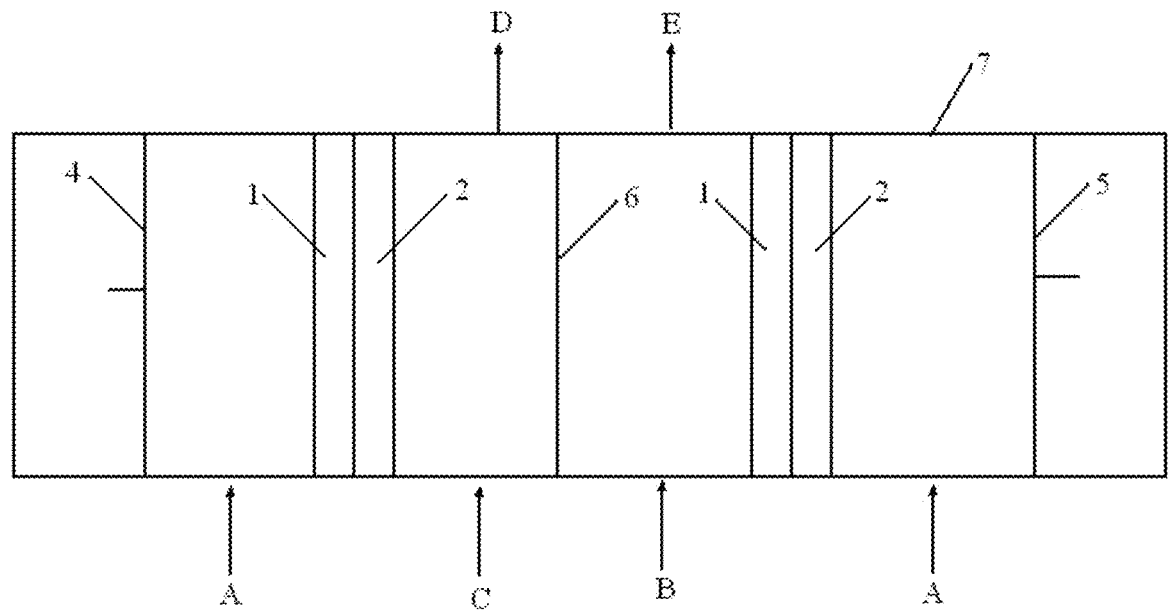
FIG. 2 is another embodiment of the treatment of the second liquid phase by using a dual-chamber bipolar membrane electrodialysis.

The membrane stack of the dual-chamber bipolar membrane electrodialysis can also be composed of at least two bipolar membranes and at least one anion exchange membrane, and the bipolar membranes and the anion exchange membrane are arranged alternately. In the practical operation, as shown in FIG. 2, at least two bipolar membranes and at least one anion exchange membrane 6 are arranged between the positive electrode 4 and the negative electrode 5, and the bipolar membranes and the anion exchange membrane 6 are alternately arranged; water C enters the acid chamber between the cation exchange layer 2 of the bipolar membranes and the anion exchange membrane 6; the second liquid phase B enters the alkali chamber between the anion exchange layer 1 of the bipolar membranes and the anion exchange membrane 6; the aqueous electrolyte solution A is filled into the electrode chamber between the positive electrode 4 and the anion exchange layer 1 of the bipolar membranes and the electrode chamber between the negative electrode 5 and the cation exchange layer 2 of the bipolar membranes; a direct current is applied between the positive electrode 4 and the negative electrode 5 for an electrodialysis treatment. Thus, the acid liquor D is obtained in the acid chamber and the alkali liquor E is obtained in the alkali chamber.

Figure 3:
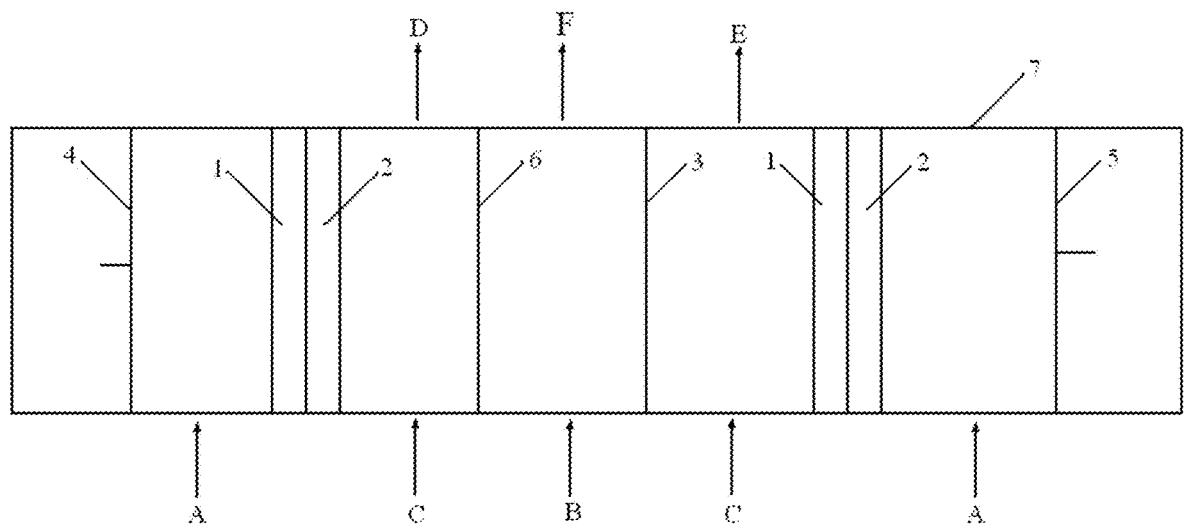
FIG. 3 is an embodiment of the treatment of the second liquid phase by using a triple-chamber bipolar membrane electrodialysis.

The membrane stack of the triple-chamber bipolar membrane electrodialysis can be composed of at least two bipolar membranes, at least one cation exchange membrane and at least one anion exchange membrane, wherein the cation exchange membrane and the anion exchange membrane in pair separate the bipolar membranes from each other. In the practical operation, as shown in FIG. 3, at least two bipolar membranes and at least one cation exchange membrane 3 and at least one anion exchange membrane 6 are arranged between the positive electrode 4 and the negative electrode 5, wherein the cation exchange membrane 3 and the anion exchange membrane 6 in pair separate the bipolar membranes from each other; the second liquid phase B enters the salt chamber between the cation exchange membrane 3 and the anion exchange membrane 6; water C enters the acid chamber between the cation exchange layer 2 of the bipolar membranes and the anion exchange membrane 6 and the alkali chamber between the anion exchange layer 1 of the bipolar membranes and the cation exchange membrane 3; the aqueous electrolyte solution A is filled into the electrode chamber between the positive electrode 4 and the anion exchange layer 1 of the bipolar membranes and the electrode chamber between the negative electrode 5 and the cation exchange layer 2 of the bipolar membranes; a direct current is applied between the positive electrode 4 and the negative electrode 5 for an electrodialysis treatment. Thus, the acid liquor D is obtained in the acid chamber; the alkali liquor E is obtained in the alkali chamber, and the desalted water F is obtained in the salt chamber.

Preferably, the second liquid phase is treated with a triple-chamber bipolar membrane electrodialysis. The produced acid liquor can be used in the ion exchange process of the molecular sieve; the produced alkali liquor can be used as the alkali source in the synthesis process of the molecular sieve; the produced desalted water can be used as the water for one, two or three of the following processes: the molecular sieve synthesis process, the crystallization process and the washing process.

Figure 4:
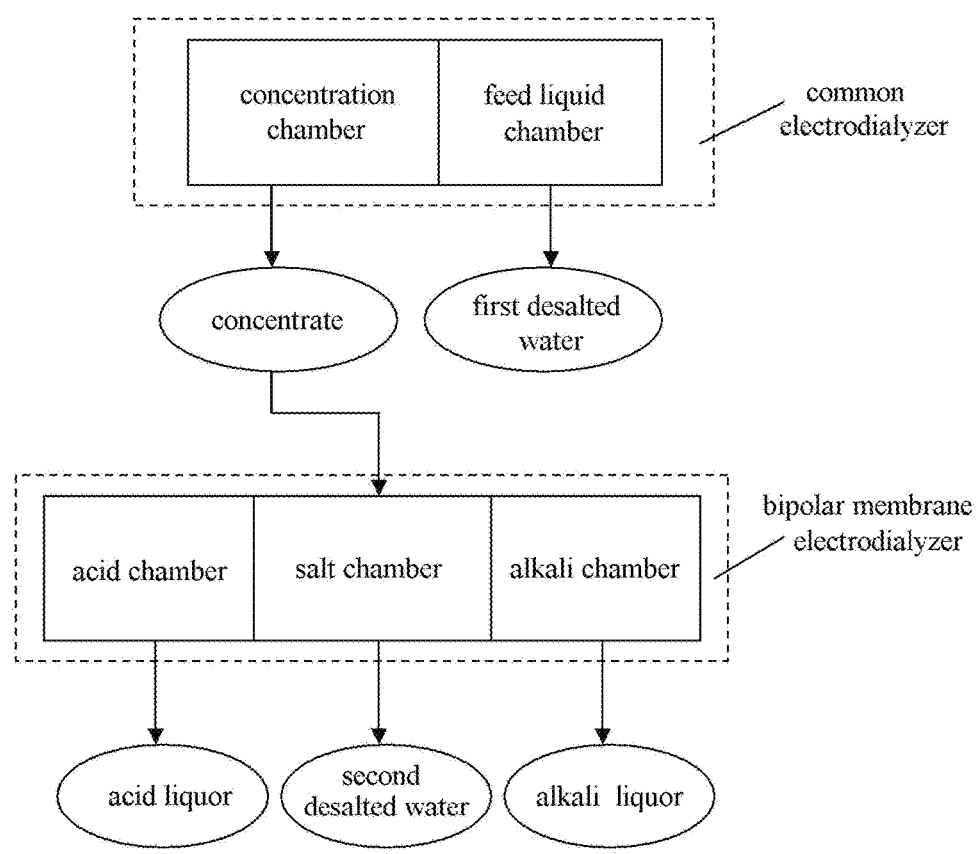
FIG. 4 is an embodiment of the treatment of the second liquid phase by using a common electrodialysis-triple-chamber bipolar membrane electrodialysis.

In a preferred embodiment of the invention, the triple-chamber bipolar membrane electrodialysis is combined with the common electrodialysis, wherein the common electrodialysis is located upstream of the triple-chamber bipolar membrane electrodialysis. That is, the second liquid phase enters the common electrodialysis for an electrodialysis, from which a concentrate and a first desalted water are obtained. The concentrate enters the bipolar membrane electrodialysis for a bipolar membrane electrodialysis. The first desalted water obtained from the common electrodialysis is recycled as the water for the molecular sieve synthesis process and/or the washing water for the washing process. Specifically, as shown in FIG. 4, the second liquid phase enters the feed liquid chamber of the common electrodialysis for an electrodialysis, from which a concentrate and a first desalted water are respectively produced. The first desalted water can be recycled as the water for the molecular sieve synthesis process, the water for the crystallization process and/or the washing water for the washing process. The concentrate enters the salt chamber of the bipolar membrane electrodialysis for a bipolar membrane electrodialysis, from which an acid liquor, an alkali liquor and a second desalted water are produced. The acid liquor can be used in the ion exchange process of the molecular sieve; the alkali liquor can be used as the alkali source in the synthesis process of the molecular sieve; the second desalted water can be used as the water for the synthesis process of the molecular sieve, the water for the crystallization process and/or the washing water for the washing process.

In the present invention, "common electrodialysis" refers to the electrodialysis wherein no bipolar membrane is used in the membrane stack. "Bipolar membrane electrodialysis" refers to the electrodialysis wherein at least a part of the membrane units in the membrane stack comprises a bipolar membrane. The electrodialysis wherein a common electrodialysis and a triple-chamber bipolar membrane electrodialysis are connected in series in the above preferable manner is called as a common electrodialysis-triple-chamber bipolar membrane electrodialysis.

According to the method of the present invention, the voltage applied to each membrane unit in the electrodialysis can be 0.1-8V, preferably 1-6V, more preferably 2-5V and even preferably 2-3V for the bipolar membrane electrodialysis. The voltage applied to each membrane unit can be 0.1-8V, preferably 1-6V, more preferably to 2-5V and even preferably 2-3V for the common electrodialysis.

According to the method of the present invention, the cation exchange membrane in the bipolar membrane electrodialysis and the common electrodialysis is a styrene-type homogeneous cation exchange membrane when the silicon-containing wastewater comprises quaternary ammonium ions. The inventor of the present invention found in the study that when a homogeneous cation exchange membrane was used for an electrodialysis, the migration speed of the quaternary ammonium ions was closely associated with the material of the homogeneous cation exchange membrane, as was different from inorganic ions such as $Na^r$; when a poly(ether-ether-ketone) homogeneous cation exchange membrane, perfluoroethylene sulfonic acid homogeneous cation exchange membrane or polysulfone homogeneous cation exchange membrane was used for an electrodialysis, no good electrodialysis effect could be achieved even if a high voltage was applied on the membrane unit; the quaternary ammonium ion content in the produced desalted water was still very high. Basically, it was impossible to achieve the effect of reducing the quaternary ammonium ion content, and the removal rate of the quaternary ammonium ions was less than 10%. However, a good electrodialysis effect could be achieved when a styrene-type homogeneous cation exchange was used. The quaternary ammonium ion content in the produced desalted water was significantly reduced as quaternary ammonium ions were enriched in the alkali liquor. The removal rate of the quaternary ammonium ions was 92% or even 95%.

The ion exchange capacity of the styrene-type homogeneous cation exchange membrane is not particularly limited. It can be a conventional selection, such as 1-3 meq/g dry membrane, preferably 1.5-3 meq/g dry membrane and more preferably 1.8-2.6 meq/g dry membrane. According to the method of the present invention, the membrane surface resistance of the styrene-type cation exchange membrane can be 1-15 $\Omega \cdot cm^2$, preferably 2-12 $\Omega \cdot cm^2$. According to the method of the invention, the membrane surface resistance of the styrene-type homogeneous cation exchange membrane is more preferably 4-9 $\Omega \cdot cm^2$ for further improving the electrodialysis effect.

According to the method of the present invention, the use of the above styrene-type homogeneous cation exchange membrane can also achieve a better electrodialysis effect compared with other cation exchange membranes for the silicon-containing wastewater which does not comprise quaternary ammonium ions. Compared with heterogeneous cation exchange membranes, the styrene-type homogeneous cation exchange membrane not only can achieve a better electrodialysis effect but also can achieve a longer service life of the membranes, and thereby prolong the stable operation time of the electrodialyzer, improve the production efficiency and reduce the operation energy consumption.

According to the method of the present invention, the kinds of the bipolar membranes and the anion exchange membrane are not particularly limited. Conventional membranes can be used. As for the anion exchange membrane, further improving the service life of the membrane, a homogeneous anion exchange membrane is preferred, for example, one of a styrene-type anion exchange membrane, a polysulfone-type anion exchange membrane, poly(ether-ether-ketone) anion exchange membrane and a perfluoroethylene sulfonic acid anion exchange membrane or the combinations of two or more of the above, preferably a styrene-type anion exchange membrane. According to the method of the invention, the specific parameters of the anion exchange membrane can be conventionally selected without any specific limitation. For example, the ion exchange capacity of the anion exchange membrane can be 0.5-5 meq/g dry membrane, preferably 1-4 meq/g dry membrane, and more preferably 2-2.5 meq/g dry membrane. The membrane surface resistance of the anion exchange membrane can be 1-15 $\Omega \cdot cm^2$, preferably 2-12 $\Omega \cdot cm^2$.

Generally, the said quaternary ammonium ion can be a quaternary ammonium ion as represented by formula I,

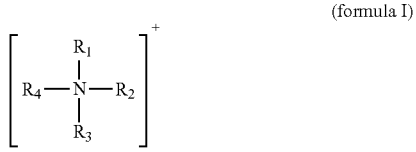

(formula I)

In formula I, $R_1$, $R_2$, $R_3$ and $R_4$ may independently be $C_1$-$C_5$ alkyl and $C_6$-$C_{12}$ aryl. The $C_1$-$C_5$ alkyl includes $C_1$-$C_5$ linear alkyl and $C_3$-$C_5$ branched alkyl. The specific examples include methyl, ethyl, n-propyl, isopropyl, n-butyl, sec-butyl, isobutyl, tert-butyl, n-amyl, isoamyl, tert-amyl and neo-amyl. Specific examples of the $C_6$-$C_{12}$ aryl include but are not limited to: phenyl, naphthyl, 4-methylphenyl, 2-methylphenyl, 3-methylphenyl, 4-ethylphenyl, 2-ethylphenyl and 3-ethylphenyl.

Preferably, the quaternary ammonium ion can be tetramethyl-ammonium ion, tetraethylammonium ion, tetrapropylammonium ion, and tetrabutyl ammonium ion. As a preferable example, the quaternary ammonium ion is tetrapropylammonium ion.

The quaternary ammonium ion can be derived from quaternary ammonium hydroxide and/or quaternary ammonium salt. The anion of the quaternary ammonium salt can be a common anion, such as a halogen ion, preferably a chloride or bromide ion, which is able to form a water-soluble salt with the quaternary ammonium ion.

The silicon-containing wastewater which comprises quaternary ammonium ions can be, for example, the wastewater derived from the preparation of a molecular sieve using quaternary ammonium hydroxide as the template. The specific examples of a molecular sieve using quaternary ammonium hydroxide as the template may include but are not limited to a titanium silicalite molecular sieve, a beta molecular sieve and a ZSM molecular sieve. The specific method for the preparation of a molecular sieve using quaternary ammonium hydroxide as the template is known in the field, for example, see the preparation methods as disclosed in CN1167082A, CN1239015A and CN1239016A.

The use of the method of the present invention for treating the silicon-containing wastewater produced in the preparation of a molecular sieve can achieve an effective reuse of the recoverable resources in the silicon-containing wastewater with a high utilization rate of the wastewater. Basically no wastewater or an extremely low volume of wastewater is discharged. In the meanwhile, the discharged solid wastes are in a very low amount.

According to the second aspect of the present invention, the invention further provides a method for the utilization of a silicon-containing wastewater, wherein the silicon-containing wastewater comes from the preparation of a molecular sieve. The method comprises the treatment of the silicon-containing wastewater by the method according to the first aspect of the present invention.

Therein, the silicon-containing solid phase obtained in step (2) is recycled as the raw material for a molecular sieve synthesis;

at least a part of the second liquid phase obtained in step (4) is recycled as the washing water in the washing process of the molecular sieve;

the acid liquor obtained in step (5) is recycled in the ion exchange process of the molecular sieve (for example, as the ion exchange liquid of the non-hydrogen molecular sieve for preparing a hydrogen molecular sieve); the alkali liquor obtained in step (5) is recycled as the alkali source in the molecular sieve synthesis.

When the silicon-containing wastewater is treated using the method according to the first aspect of the present invention, in case that step (5) adopts the method of a triple-chamber bipolar membrane electrodialysis or a common electrodialysis-triple-chamber bipolar membrane electrodialysis for treating the second liquid phase, in addition to the use of the acid liquor obtained from electrodialysis in the ion exchange process of the molecular sieve and the reuse of the alkali liquor obtained from the bipolar membrane electrodialysis as the alkali source in the molecular sieve synthesis, the desalted water can also be recycled as the water for the molecular sieve synthesis process and/or as the washing water in the washing process.

According to the third aspect of the invention, the present invention provides a method for the preparation of a molecular sieve, comprising a synthesis step, a crystallization step, a separation step, a washing step, a wastewater recovery and recycling step, and an optional ion exchange step.

In the synthesis process, the silicon source and the alkali source as well as the optional aluminum source and the optional titanium source are contacted in water for reaction; in the crystallization step, the mixture obtained from the synthesis step is crystallized;

in the separation step, the mixture obtained from the crystallization step is subjected to a solid-liquid separation to produce a solid phase and a liquid phase;

in the washing step, the solid phase obtained from the separation step is washed with the washing water to produce a molecular sieve and washing wastewater;

in the ion exchange step, the molecular sieve is contacted with the ion exchange liquid. After the ion exchange, the solid-liquid separation is carried out to produce an ion exchanged molecular sieve and an ion exchange waste liquid;

in the wastewater recovery and recycling step, wastewater is collected and treated using the method according to the first aspect of the present invention. The wastewater is one of the liquid phase in the separation step, the washing wastewater in the washing step and the ion exchange waste liquid in the ion exchange step or mixtures of two or more of the above waste liquids, preferably the washing wastewater in the washing step and the ion exchange waste liquid in the ion exchange step. The liquid phase in the separation step can be treated using the method according to the first aspect of the invention or using other methods to recover the silicon element therein. The waste liquid from which the silicon element is recovered is treated using the method according to the first aspect of the invention. In the present invention, "optional" refers to "comprise or not comprise" or "include or not include".

In a preferred embodiment, a part of the alkali source in the synthesis step preferably comes from the alkali liquor obtained in the wastewater recovery and recycling step.

In a preferred embodiment, in the electrodialysis treatment of the second liquid phase with a bipolar membrane electrodialysis or a common electrodialysis-triple-chamber bipolar membrane electrodialysis, a part of the water used in the synthesis step preferably comes from the desalted water obtained in the electrodialysis.

In a preferred embodiment, a part of the washing water in the separation and washing step preferably comes from the second liquid phase obtained in the wastewater recovery and recycling step.

In a preferred embodiment, the ion exchange fluid in the ion exchange step is an acid liquor. A part of the acid liquor comes from the acid liquor obtained in the wastewater recovery and recycling step.

According to the method for the preparation of a molecular sieve according to the present invention, all of the second liquid phase can be used as the washing water in the separation and washing step, or subjected to a bipolar membrane electrodialysis treatment. Or a part of the second liquid phase can be used as the washing water in the molecular sieve washing process and the rest of the second liquid phase is subjected to a bipolar membrane electrodialysis treatment.

According to the method for the preparation of a molecular sieve according to the present invention, the specific operation conditions of the synthesis step and the crystallization step can be conventionally selected without any specific limitation. The separation method adopted in the separation step can be a common solid-liquid separation method in the present field, such as filtration, without any specific limitation.

The method for the preparation of a molecular sieve according to the present invention not only improves the utilization rate of silicon but also achieves a higher water recovery and a comprehensive reuse of resources while significantly reducing the amount of wastewater and wastes produced in the preparation of the molecular sieve.

Figure 5:
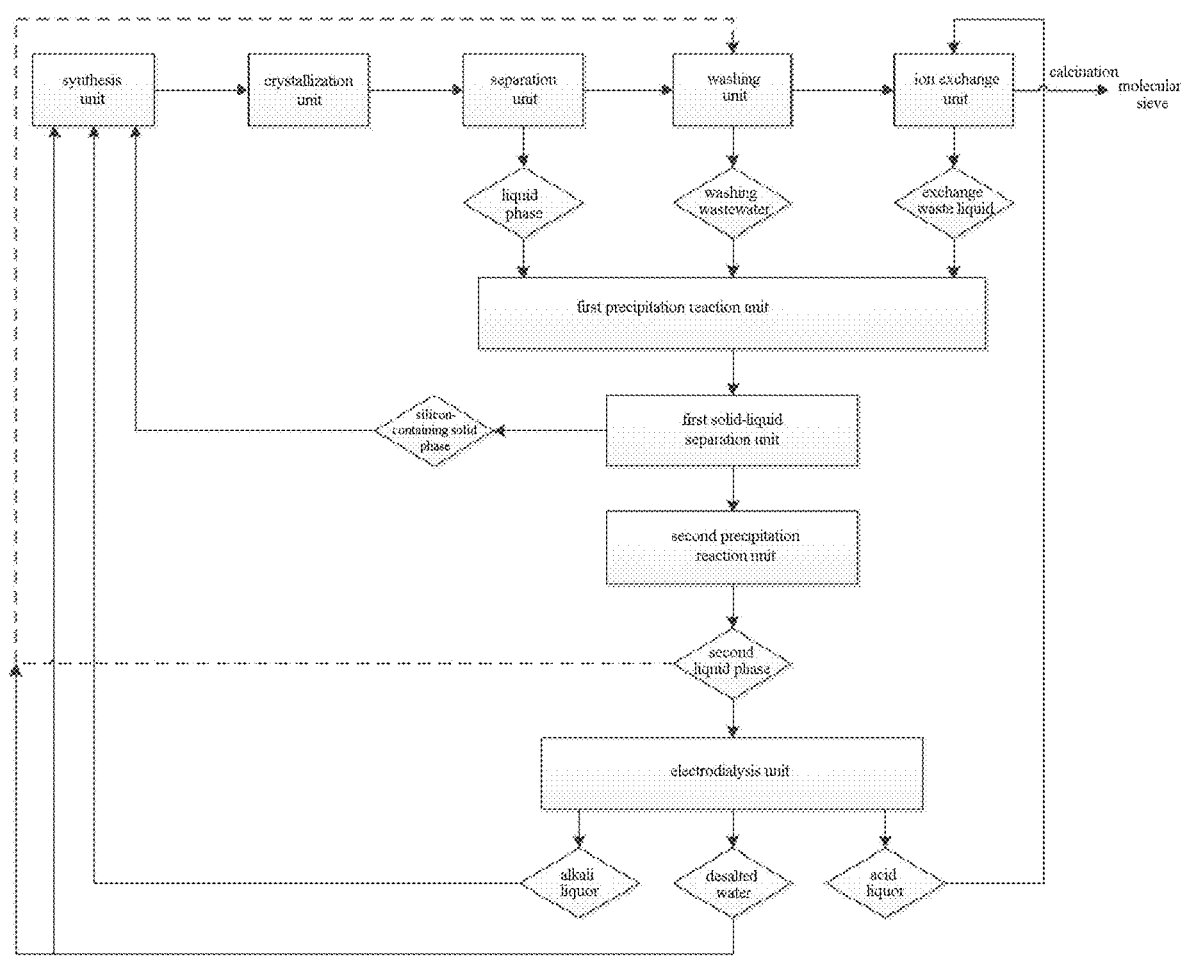
FIG. 5 is used to illustrate a method for the preparation of a molecular sieve and a molecular sieve preparation system according to the present invention.

According to the fourth aspect of the invention, as shown in FIG. 5, the present invention provides a molecular sieve preparation system, comprising a synthesis unit, a crystallization unit, a separation unit, a washing unit, a wastewater recovery and recycling unit, and an optional ion exchange unit.

The said synthesis unit is used for contacting the silicon source and the alkali source as well as the optional aluminum source and the optional titanium source in water for reaction. The synthesis unit generally comprises a reactor for contacting the silicon source and the alkali source as well as the optional aluminum source in water for reaction. The said reactor can be a conventional reactor without any specific limitation.

The crystallization unit is used for crystallizing the mixture from the synthesis unit. The crystallization unit can adopt a conventional crystallization tank.

The separation unit is used for carrying out a solid-liquid separation on the mixture obtained in the crystallization unit to produce a solid phase and a liquid phase, and delivering the liquid phase into the wastewater recovery and recycling unit. The separation unit can adopt a conventional solid-liquid separation device, such as a plate and frame filter, belt filter.

The washing unit is used for washing the solid phase obtained in the separation unit to produce a molecular sieve and washing wastewater. The washing wastewater is delivered into the wastewater recovery and recycling unit. The separation unit and the washing unit can be carried out in different devices or share one device.

The ion exchange unit is used for contacting the molecular sieve obtained in the separation and washing unit with the ion exchange liquid for an ion exchange. An ion exchanged molecular sieve and an ion exchange waste liquid are thus produced. The ion exchange waste liquid is delivered into the wastewater recovery and recycling unit. The said ion exchange can be carried out in various common methods of ion exchange. For example, the molecular sieve can be mixed with the ion exchange liquid for an ion exchange. The kind of the ion exchange fluid can be selected according to the type of the desired molecular sieve. For example, an acid liquor can be contacted with a non-hydrogen molecular sieve to produce a hydrogen molecular sieve.

The wastewater recovery and recycling unit is used for treating the wastewater. As shown in FIG. 5, the wastewater recovery and recycling unit includes a first precipitation reaction unit, a first solid-liquid separation unit, an optional second precipitation reaction unit, an optional second solid-liquid separation unit, and an optional electrodialysis unit.

The first precipitation reaction unit is used for contacting the wastewater with at least one acid or at least one alkali so that the silicon in the wastewater forms a colloid. Thus a mixture containing a colloid is obtained. The first precipitation reaction unit can adopt various common precipitation reactors. The methods and conditions for contacting the wastewater with at least one acid or at least one alkali so that the silicon in the wastewater forms a colloid have been described in details as above. No more details are provided herein.

The first solid-liquid separation unit is used for carrying out a solid-liquid separation on the mixture containing a colloid obtained in the first precipitation reaction unit to produce a silicon-containing solid phase and a first liquid phase. The said first solid-liquid separation unit may include a filter device, a centrifugal device or a combination of two or more separation devices, preferably comprising a filter device, to separate the mixture containing a colloid. The filter device can adopt a variety of common filter media, for example, one selected from a fabric, a porous material, a solid particle layer and a porous membrane or a combination of two or more of the above. The said porous membrane can be an organic membrane, an inorganic membrane or a combination of the above two. The said inorganic membrane can be a ceramic membrane and/or a metal membrane; the organic membrane can be a hollow fiber membrane. Preferably, a fabric is used as the filter medium. The said filter device can specifically be a plate and frame filter and/or a belt filter.

The second precipitation reaction unit is used for regulating the pH value of the first liquid phase to 8 or more and introducing $CO_3^{2-}$ and/or $Ca^{2+}$ into the first liquid phase so that at least a part of the metal elements in the first liquid phase can form a precipitate. The said second precipitation reaction unit can adopt a conventional sedimentation reactor without any special limitation. The method and conditions for adjusting the pH value of the first liquid phase to 8 or more and introducing $CO_3^{2-}$ and/or $Ca^{2+}$ to the first liquid phase so that at least a part of the metal elements in the first liquid phase can form a precipitate have been described in details as above. No more details are provided herein.

The second solid-liquid separation unit is used for carrying out a solid-liquid separation on the mixture obtained in the second precipitation reaction unit to produce a solid phase and a second liquid phase. The said second solid-liquid separation unit may include a filter device, a centrifugal device or a combination of two or more separation devices, preferably comprising a filter device. The filter device can adopt a variety of common filter media, for example, one selected from a fabric, a porous material, a solid particle layer and a porous membrane or a combination of two or more of the above. The said porous membrane can be an organic membrane, an inorganic membrane or a combination of the above two. The said inorganic membrane can be a ceramic membrane and/or a metal membrane; the organic membrane can be a hollow fiber membrane. Preferably, a fabric is used as the filter medium.

The electrodialysis unit is used for an electrodialysis of at least a part of the second liquid phase to obtain an acid liquor and an alkali liquor. The electrodialyser used in the electrodialysis unit can be a conventional bipolar membrane electrodialyser or a combination of a common electrodialyser and a bipolar membrane electrodialysis. The said bipolar membrane electrodialyser can be a dual-chamber bipolar membrane electrodialyser or a triple-chamber bipolar membrane electrodialyser. The membrane stack of the dual-chamber bipolar membrane electrodialyser can be composed of a bipolar membrane and a cation exchange membrane or an anion exchange membrane. The membrane stack of the triple-chamber bipolar membrane electrodialyser can be composed of a bipolar membrane, a cation exchange membrane and an anion exchange membrane. The electrodialyser and the operation method thereof have been described in details as above in combination with FIG. 1 to FIG. 4. No more details are provided herein.

According to the molecular sieve preparation system of the present invention, preferably, the wastewater recovery and recycling unit further includes a solid phase material delivery pipeline for delivering the silicon-containing solid phase into the synthesis unit as a silicon source, thereby achieving a reuse of the silicon-containing solid phase as recovered.

According to the molecular sieve preparation system of the present invention, preferably, the wastewater recovery and recycling unit further includes a liquid phase material delivery pipeline for delivering at least a part of the second liquid phase into the washing unit as the washing water.

According to the molecular sieve preparation system of the present invention, preferably, the wastewater recovery and recycling unit further includes an acid liquid delivery pipeline for delivering at least a part of the acid liquor into the ion exchange unit as the ion exchange liquid.

According to the molecular sieve preparation system of the present invention, preferably, the wastewater recovery and recycling unit further includes an alkali liquid material delivery pipeline for delivering at least a part of the alkali liquor into the synthesis unit as an alkali source.

According to the molecular sieve preparation system of the present invention, when the electrodialysis unit uses a triple-chamber bipolar membrane electrodialyser or a conventional electrodialyser-triple-chamber bipolar membrane electrodialyser, the wastewater recovery and recycling unit further includes a desalted water delivery pipeline for delivering at least a part of the desalted water or at least a part of the further desalted water into the synthesis unit as water for synthesis.

This invention is explained in details as below in combination with examples, which however does not limit the protection scope of the present invention.

In the following examples and comparative examples, the contents of various elements in the silicon-containing wastewater and the treated water were determined in the method of inductively coupled plasma (ICP). The content of quaternary ammonium ions in the wastewater and the treated water was determined in the method of titration method. The relative crystallinity of the molecular sieve was determined according to the method disclosed on pages 414-415 of «*Analysis Method of Petrochemical Engineering*» (RIPP Test Method) (Yang Cuiding, Science Press, 1990).

Examples 1-7 are used to illustrate the invention.

Example 1

The silicon-containing wastewater treated in the present example is the primary wastewater of the washing wastewater produced in the preparation process of a hydrogen ZHP molecular sieve. The kinds of the elements therein and the contents thereof are listed in Table 1.

The bipolar membrane used in the present example is of type BP-1 purchased from Japanese ASTOM Company; the cation exchange membrane is a styrene-type homogeneous cation exchange membrane (with an ion exchange capacity of 2.51 meq/g dry membrane and membrane surface resistance (25° C., 0.1 mol/L NaCl aqueous solution, the same below) of 4.59 $\Omega \cdot cm^2$) purchased from Hebei Guangya Company; the anion exchange membrane is a styrene-type homogeneous anion exchange membrane (with an ion exchange capacity of 2.45 meq/g dry membrane and membrane surface resistance of 9.46 $\Omega \cdot cm^2$) purchased from Hebei Guangya Company.

The following flow process is adopted in the present example to treat the silicon-containing wastewater.

(1) Sulphuric acid (with a mass concentration of 3.5%) was added to the silicon-containing wastewater to regulate the pH value of the silicon-containing wastewater to 6.9 before stirring for reaction for 5 hours at room temperature (25° C., the same below) to produce a mixture containing a silicon colloid.

(2) The mixture containing a silicon colloid obtained in step (1) was filtered in a plate and frame filter. The filtration residue was then washed until the pH of the filtrate was 6.5. A silicon-containing filtration residue (water content of 40 wt. %) and a filtrate were thus obtained. The silica content in the filtration residue was 95 wt. % based on the total amount of the silicon element in the silicon-containing wastewater. Thus it could be used as a silicon source in the synthesis process of the molecular sieve. The results of component analysis for the produced filtrate a are shown in Table 1.

(3) Sodium carbonate and calcium oxide were added to the filtrate obtained in step (2). At the same time, the pH value of the filtrate was regulated to 10.5 by adding an aqueous solution of sodium hydroxide (with a mass concentration of 40%) to the filtrate before stirring for reaction at room temperature for 2 hours. Therein, the addition amount of sodium carbonate was 15 mmol/L and the addition amount of calcium oxide was 7 mmol/L based on the total volume of filtrate obtained in step (2).

(4) The mixture obtained in step (3) was filtered by a membrane (with the membrane pore size being 50 nm) to produce a filtration residue and a filtrate. The results of component analysis for the produced filtrate b are shown in Table 2.

Figure 6:
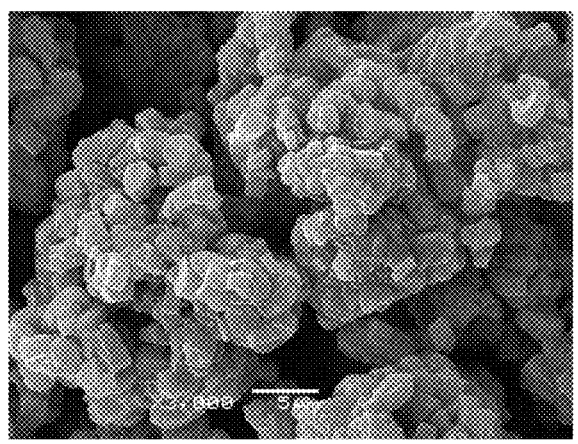
FIG. 6 is the photo of SEM of the Na molecular sieve prepared by using fresh water and fresh alkali liquor as the control group in Example 1.
Figure 7:
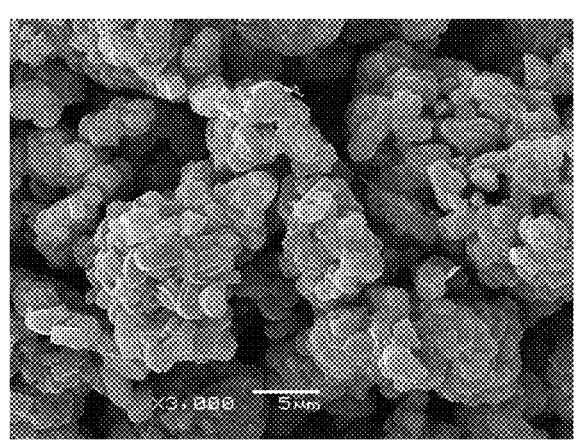
FIG. 7 is the photo of SEM of the Na molecular sieve prepared by using the desalted water, the recovered silicon source and the recovered alkali source in Example 1.

(5) The filtrate obtained in step (4) was delivered into the triple-chamber bipolar membrane electrodialyzer as shown in FIG. 3 for a bipolar membrane electrodialysis (the employed electrode liquid was a $Na_2SO_4$ aqueous solution of 3 wt. %) to produce an acid liquor, an alkali liquor and desalted water. Therein, in the bipolar membrane electrodialysis, the voltage applied to each membrane unit was regulated to 2.5V. The electrodialysis lasted 5 hours at a temperature of 35° C. The constitution and contents of the elements in the produced desalted water are listed in Table 3. The desalted water can be used as the water for a molecular sieve synthesis. The produced acid liquor having a concentration of 2.5 wt. % can be used as an ion exchange liquid for an ion exchange with the molecular sieve to produce a hydrogen molecular sieve. The produced alkali liquor can be concentrated into an alkali liquor having a concentration of 10 wt. % which can be used as an alkali source for a molecular sieve synthesis. Table 4 show the structural parameters of the Na molecular sieve prepared using fresh water and a fresh alkali liquor of the control group and the Na molecular sieve prepared using the recovered desalted water, the recovered silicon source and the recovered alkali source of Example 1. FIG. 6 is the SEM photo of the Na molecular sieve prepared in the control group. FIG. 7 is the SEM photo of the Na molecular sieve prepared using the recovered desalted water, the recovered silicon source and the recovered alkali source.

The results of Table 4, FIG. 6 and FIG. 7 demonstrate that there is no significant difference in the structure and appearance between the Na molecular sieve prepared using the recovered desalted water, the recovered silicon source and the recovered alkali source in Example 1 and the molecular sieve prepared using the corresponding fresh raw materials. The above indicates that the treatment of wastewater from the preparation of a molecular sieve using the method of the present invention can effectively recover and recycle various useful materials.

Comparative Example 1

A method identical to the method in Example 1 was adopted for treating the silicon-containing wastewater. The difference lies in that sulphuric acid was replaced with sulfated aluminum sulfate in step (1) so that the pH value of the silicon-containing wastewater was regulated to 6.9 before reacting for 2 hours at room temperature. A mixture containing a silicon colloid was thus produced. The results of the component analysis of the filtrate a are shown in Table 1.

Comparative Example 2

A method identical to the method in Example 1 was adopted for treating the silicon-containing wastewater. The difference lies in that the membrane filtration was carried out directly in step (3) without an addition of sodium carbonate, calcium oxide and sodium hydroxide to produce a filtration residue and filtrate b. The results of component analysis for the produced filtrate b are shown in Table 2.

Example 2

A method identical to the method in Example 1 was adopted for treating the silicon-containing wastewater. The difference lies in that sulphuric acid (with a mass concentration of 3.5%) was added to the silicon-containing wastewater in step (1) to regulate the pH value of the silicon-containing wastewater to 4.8 before stirring for reaction for 5 hours at room temperature (25° C., the same below). A mixture containing a silicon colloid was thus obtained.

The filtration residue having a silica content of 96 wt. % produced in step (2) could be used as the silicon source in the molecular sieve synthesis process. The results of the component analysis of the filtrate a are shown in Table 1.

Comparative Example 3

A method identical to the method in Example 2 was adopted for treating the silicon-containing wastewater. The difference lies in that sulphuric acid was replaced with sulfated aluminum sulfate in step (1) so that the pH value of the silicon-containing wastewater was regulated to 4.8 before reacting for 5 hours at room temperature. A mixture containing a silicon colloid was thus produced. The results of the component analysis of the filtrate a are shown in Table 1.

Example 3

A method identical to the method in Example 1 was adopted for treating the silicon-containing wastewater. The difference lies in that sulphuric acid (with a mass concentration of 3.5%) was added to the silicon-containing wastewater in step (1) to regulate the pH value of the silicon-containing wastewater to 8.8 before stirring for reaction for 5 hours at room temperature (25° C., the same below). A mixture containing a silicon colloid was thus obtained. The filtration residue having a silica content of 93 wt. % produced in step (2) could be used as the silicon source in the molecular sieve synthesis process. The results of the component analysis of the filtrate a are shown in Table 1.

TABLE 1

Constitution of the silicon-containing wastewater and filtrate a

|  | Na, mg/L | Ca, mg/L | Si, mg/L | Mg, mg/L | Al, mg/L |
|---|---|---|---|---|---|
| Silicon-containing wastewater | 7200 | 33.1 | 10300 | 5.9 | 3.0 |
| Example 1 (filtrate a) | 6187 | 21.8 | 120 | 4.2 | 0.8 |
| Comparative Example 1 (filtrate a) | 4777 | 26.0 | 286 | 6.5 | 38.9 |
| Example 2 (filtrate a) | 5743 | 38.8 | 94 | 8.2 | 0.8 |
| Comparative Example2 (filtrate a) | 5309 | 33.5 | 922 | 8.7 | 68.4 |
| Example 3 (filtrate a) | 4981 | 23.8 | 226 | 5.9 | 1.0 |

TABLE 2

Constitution of filtrate b

|  | Na, mg/L | Ca, mg/L | Si, mg/L | Mg, mg/L | Al, mg/L |
|---|---|---|---|---|---|
| Example 1 (filtrate b) | 7510 | 2.7 | 34 | <1.0 | <1.0 |
| Comparative Example 2 (filtrate b) | 6135 | 20.9 | 117 | 4.2 | 0.7 |

TABLE 3

Constitution of the silicon-containing wastewater and the produced desalted water

|  | Na, mg/L | Ca, mg/L | Si, mg/L | Mg, mg/L | Al, mg/L |
|---|---|---|---|---|---|
| Silicon-containing wastewater | 7200 | 33.1 | 10300 | 5.9 | 3.0 |
| Example 1 (desalted water) | 510 | 3.2 | 31 | <1.0 | <1.0 |
| Example 2 (desalted water) | 500 | 3.0 | 28 | <1.0 | <1.0 |
| Example 3 (desalted water) | 550 | 3.5 | 34 | <1.0 | <1.0 |

TABLE 4

Structural parameters of the Na molecular sieve

|  | Relative crystallinity, % | $SiO_2$, wt. % | $Al_2O_3$, wt. % |
|---|---|---|---|
| Control group | 110.1 | 95.8 | 3.62 |
| Example 1 | 110.9 | 96.1 | 3.68 |

TABLE 5

Constitution of the silicon-containing wastewater and the produced desalted water

|  | Na, mg/L | Ca, mg/L | Si, mg/L | Mg, mg/L | Al, mg/L |
|---|---|---|---|---|---|
| Silicon-containing wastewater | 2342 | 38.1 | 656 | 2.5 | 5.8 |
| Example 4 (desalted water) | 56 | 2.3 | 27 | <1.0 | <1.0 |

As can be seen from the results of Table 1, the content of silicon in the filtrate obtained in Comparative Example 1 and Comparative Example 3 is still relatively high, which results in a low recovery rate of silicon and an extra introduction of aluminum. $Ca^{2+}$ and $CO_3^{2-}$ are not introduced in Comparative Example 2, and the use of the membrane filtration alone does not achieve the effect of a deep desilication. Moreover, when the content of silicon and aluminum is high in the filtrate, silicon and aluminum can easily scale on the surface of the ion exchange membrane and/or the bipolar membrane of electrodialysis, which has an adverse effect on the electrodialysis effect, and also significantly shortens the service life of the ion exchange membrane and/or the bipolar membrane. The method of the present invention can significantly improve the recovery rate of silicon.

Example 4

The silicon-containing wastewater treated in the present example is a mixture of the washing waste water produced in the preparation of a hydrogen ZHP molecular sieve and the ion exchange waste liquid produced in ion exchange process. The kinds of the elements therein and the contents thereof are listed in Table 5.

A method identical to the method in Example 1 was adopted for treating the silicon-containing wastewater. The difference lies in that the common electrodialysis-triple-chamber bipolar membrane electrodialysis device as shown in FIG. 4 was adopted in step (5) for the treatment (the electrode liquid used being a $Na_2SO_4$ aqueous solution of 3 wt. %). The electrodialysis lasted 6 hours. Moreover, the cation exchange membrane used herein was a styrene-type homogeneous cation exchange membrane (with an ion exchange capacity of 2.5 meq/g dry membrane and a membrane surface resistance of 8 $\Omega \cdot cm^2$) purchased from Beijing Tingrun Membrane Technology Development Co., LTD. The anion exchange membrane used herein was a homogeneous anion exchange membrane (with an ion exchange capacity of 2.5 meq/g dry membrane and a membrane surface resistance of 2.36 $\Omega \cdot cm^2$) purchased from Beijing Tingrun Membrane Technology Development Co., LTD. The voltage applied to each membrane unit was regulated to 2V in the common electrodialysis; the voltage applied to each membrane unit was regulated to 3V in the triple-chamber bipolar membrane electrodialysis. The temperature in both the common electrodialyzer and the bipolar membrane electrodialyzer was controlled as 35° C. The constitution of the elements in the desalted water produced from the common electrodialysis and the bipolar membrane electrodialysis and the contents thereof are listed in Table 5.

From the results of table 5, it can be seen that the use of the composite process of the common electrodialysis-bipolar membrane electrodialysis on the one hand has better effects in improving the concentration and in desalination with a lower content of impurities in the desalted water, which is advantageous in reuse. On the other hand, the common electrodialysis can protect the bipolar membrane electrodialysis. In addition to an impurity removal, the pH value in the common electrodialysis changes less, and the silicon and aluminum remained in the filtrate do not settle due to the change of pH value, which is beneficial to the stable operation of electrodialysis.

Example 5

The silicon-containing wastewater treated in the present example is the washing wastewater produced in the preparation process of a CDY molecular sieve. The kinds of the elements therein and the contents thereof are listed in Table 6.

The bipolar membrane used in the present example is of type BP-1 purchased from Japanese ASTOM Company; the cation exchange membrane is a styrene-type homogeneous cation exchange membrane purchased from Hebei Guangya Company (the same as Example 1); the anion exchange membrane is a styrene-type homogeneous anion exchange membrane purchased from Hebei Guangya Company (the same as Example 1).

The following flow process was adopted in the present example to treat the silicon-containing wastewater.

(1) An aqueous solution of sodium hydroxide (with a mass concentration of 3.5%) was added to the silicon-containing wastewater to regulate the pH value of the silicon-containing wastewater to 6.5 before stirring for reaction for 3 hours at a temperature of 50° C. to produce a mixture containing an aluminosilica colloid.

(2) The mixture containing a silicon colloid produced in step (1) was delivered to a plate and frame filter for a filtration. The filtration residue was washed to produce a silicon-containing filtration residue (with water content of 36 wt. %) and a filtrate. Therein the purity of silica in the filtration residue was 97 wt. % based on the total amount of the silicon element in the silicon-containing wastewater. Thus it could be used as the silicon source in the synthesis process of the molecular sieve. The results of component analysis for the filtrate a are shown in Table 6.

(3) Sodium carbonate was added to the filtrate obtained in step (2). At the same time, the pH value of the filtrate was regulated to 10 by adding ammonia water to the filtrate before stirring for reaction for 3 hours at room temperature. Therein, the addition amount of sodium carbonate was 15 mmol/L based on the total volume of filtrate obtained in step (2).

(4) The mixture obtained in step (3) was filtered by a membrane to produce a filtration residue and a filtrate b.

(5) The filtrate obtained in step (4) was delivered into the triple-chamber bipolar membrane electrodialyzer as shown in FIG. 3 for treatment (the employed electrode liquid being a $Na_2SO_4$ aqueous solution of 3 wt. %) to produce an acid liquor, an alkali liquor and desalted water. Therein the voltage applied to each membrane unit was adjusted to 3V. The electrodialysis lasted 2 hours at a temperature of 35° C. The constitution and contents of the elements in the produced desalted water are listed in Table 7. The desalted water can be used as the water for a molecular sieve synthesis. The produced acid liquor having a concentration of 3.14 wt. % can be used as the ion exchange liquid for an ion exchange with the molecular sieve to produce a hydrogen molecular sieve. The produced alkali liquor can be concentrated into an alkali liquor having a concentration of 10 wt. % which can be used as the alkali source for a molecular sieve synthesis.

TABLE 6

Constitution of the silicon-containing wastewater and filtrate a

| | Ca, mg/L | Mg, mg/L | Si, mg/L | Al, mg/L | Fe, mg/L | RE, mg/L | Na, mg/L |
|---|---|---|---|---|---|---|---|
| Silicon-containing wastewater | 20 | 8.2 | 89.1 | 18.9 | <0.1 | 133 | 5476 |
| Example 5 (filtrate a) | 19.9 | 8.2 | 5.8 | <0.1 | <0.1 | 102 | 5139 |

TABLE 7

Constitution of the silicon-containing wastewater and the produced desalted water

| | Ca, mg/L | Mg, mg/L | Si, mg/L | Al, mg/L | Fe, mg/L | RE, mg/L | Na, mg/L |
|---|---|---|---|---|---|---|---|
| Silicon-containing wastewater | 20 | 8.2 | 89.1 | 18.9 | <0.1 | 133 | 5476 |
| Example 5 (desalted water) | 5.3 | <0.1 | 2.7 | <0.1 | <0.1 | <1.0 | 259 |

Example 6

A method identical to the method in Example 5 was adopted for treating the silicon-containing wastewater. The difference lies in that the pH value was regulated to 5.5 in step (1) before stirring for reaction for 3 hours at a temperature of 50° C. A mixture containing an aluminosilica colloid was thus obtained. Filtrate a was obtained by filtration. The component analysis of the filtrate is found in Table 8. The purity of silica in the filtration residue was 95 wt. %. Thus it could be used as the silicon source in the synthesis process of a molecular sieve.

TABLE 8

Constitution of the silicon-containing wastewater and filtrate a

| | Ca, mg/L | Mg, mg/L | Si, mg/L | Al, mg/L | Fe, mg/L | RE, mg/L | Na, mg/L |
|---|---|---|---|---|---|---|---|
| Silicon-containing wastewater | 20 | 8.2 | 89.1 | 18.9 | <0.1 | 133 | 5476 |
| Example 6 (filtrate a) | 16.8 | 6.7 | 35.9 | 36.2 | <0.1 | 132 | 5031 |

The results of Examples 1 to 6 demonstrate that the use of the method of the present invention for treating the silicon-containing wastewater produced in the preparation of the molecular sieve can achieve a relatively higher silicon recovery rate and water recovery rate. Basically no wastewater and a very low amount of solid wastes are discharged, as realizes the reasonable reuse of the wastewater.

Example 7

The silicon-containing wastewater treated in the present example is the exchange wastewater produced from the preparation of an FCC catalyst. The kinds of the elements therein and the contents thereof are listed in Table 9.

The method as depicted in FIG. 4 was used in the present example for electrodialysis. The cation exchange membrane used herein is a styrene-type homogeneous cation exchange membrane purchased from Hebei Guangya Company (the same as Example 1); the anion exchange membrane used herein is a homogeneous styrene-type anion exchange membrane purchased from Hebei Guangya Company (the same as Example 1). The bipolar membrane is a bipolar membrane of type BP-1 purchased from Japanese Tokuyama Company.

The following process is used in the present example for treating the wastewater.

(1) The pH value of the wastewater was regulated to 5.5~6.0 by adding a NaOH solution (the concentration of NaOH being 3 wt. %) into the silicon-containing wastewater. The reaction lasted 5 hours at 80° C. under stirring. A mixture containing a silicon colloid was thus obtained.

(2) The mixture containing a silicon colloid obtained in step (1) was delivered into a plate and frame filter for filtration, from which a silicon-containing filtration residue (with water content of 80 wt. %) and filtrate a were produced. Therein the content of silicon oxide and alumina in the filtration residue was greater than 95 wt. %. Thus it could be used as the silicon source in the synthesis process of a molecular sieve. The results of component analysis for the produced filtrate a are shown in Table 9.

(3) After calcium oxide was added into the filtrate obtained in step (2) and evenly mixed, sodium carbonate was added. At the same time, the pH value of the filtrate was regulated to 10.5 by adding an aqueous solution of sodium hydroxide (with a mass concentration of 40%) into the filtrate. The reaction lasted 2 hours at room temperature under stirring. Therein, the addition amount of calcium oxide was 7 mmol/L and the addition amount of sodium carbonate was 15 mmol/L based on the total volume of filtrate obtained in step (2).

(4) The mixture obtained in step (3) was filtered by a membrane (with the membrane pore size being 50 nm) to produce a filtration residue and filtrate b. The results of component analysis for the filtrate b are shown in Table 9.

(5) The filtrate obtained in step (4) was delivered into the common electrodialysis-triple-chamber bipolar membrane electrodialysis device as shown in FIG. 4 for treatment (The employed electrode liquid being a $Na_2SO_4$ aqueous solution of 5 wt. %). The electrodialysis lasted 60 minutes. Therein, the voltage applied to each membrane unit was regulated to 1V in the common electrodialysis; the voltage applied to each membrane unit was regulated to 2.5V in the triple-chamber bipolar membrane electrodialysis. The temperature in both the common electrodialyzer and the bipolar membrane electrodialyzer was controlled as 35° C. The constitution of the elements in the desalted water produced from the common electrodialysis and the contents thereof are listed in Table 10.

TABLE 9

Constitution of the silicon-containing wastewater, filtrate a and filtrate b

| | Ca, mg/L | Mg, mg/L | Si, mg/L | Al, mg/L | Fe, mg/L | RE, mg/L | Na, mg/L |
|---|---|---|---|---|---|---|---|
| Silicon-containing wastewater | 20 | 8.2 | 89.1 | 18.9 | <0.1 | 133 | 5076 |
| Example 7 (filtrate a) | 19.9 | 8.2 | 15.8 | <0.1 | <0.1 | 102 | 5439 |
| Example 7 (filtrate b) | 4.5 | 0.2 | 2.8 | <0.1 | <0.1 | <0.1 | 6239 |

TABLE 10

Constitution of the silicon-containing wastewater and the produced desalted water

| | Ca, mg/L | Mg, mg/L | Si, mg/L | Al, mg/L | Fe, mg/L | RE, mg/L | Na, mg/L |
|---|---|---|---|---|---|---|---|
| Silicon-containing wastewater | 20 | 8.2 | 89.1 | 18.9 | <0.1 | 133 | 5476 |
| Example 7 (desalted water) | 5.3 | <0.1 | 2.7 | <0.1 | <0.1 | <1.0 | 259 |

The results of Example 7 demonstrate that the use of the method of the present invention for treating the silicon-containing wastewater produced in the preparation of a catalyst can achieve a relatively higher silicon recovery rate and water recovery rate. Moreover, basically no wastewater and a very low amount of solid wastes are discharged, as realizes a reasonable reuse of the wastewater.

The invention claimed is:

1. A method for treating a silicon-containing wastewater that is generated during preparation of a molecular sieve and comprises metal elements, the method comprising the following steps:
   Step (1): contacting the silicon-containing wastewater with at least one acid or at least one alkali so that at least a part of silicon in the silicon-containing wastewater form a colloid to obtain a first mixture containing the colloid;
   Step (2): subjecting the first mixture to a solid-liquid separation to produce a silicon-containing solid phase and a first liquid phase;
   Step (3): adjusting a pH value of the first liquid phase to 8 or more, and introducing $CO_3^{2-}$ and/or $Ca^{2+}$ into the first liquid phase so that at least a part of the metal elements precipitates from the first liquid phase and obtaining a second mixture containing the precipitate;
   Steps (4): subjecting the second mixture to a solid-liquid separation to produce a solid phase and a second liquid phase; and
   Step (5): subjecting at least a part of the second liquid phase to an electrodialysis treatment to produce at least one of an acid liquor, an alkali liquor, and desalted water, wherein the electrodialysis treatment comprises a common electrodialysis and a bipolar membrane electrodialysis connected in series.

2. The method according to claim 1, wherein, in step (1), the silicon-containing wastewater has a pH value in the range of 2-9.

3. The method according to claim 1, wherein, in Step (1), the at least one acid is selected from hydrochloric acid, sulfuric acid, nitric acid and phosphoric acid, or in Step (1), the at least one alkali is selected from alkali hydroxide, sodium hydroxide, potassium hydroxide, and ammonia water.

4. The method according to claim 1, wherein, in Step (3), the amount of $CO_3^{2-}$ introduced into in the first liquid phase is 0.1-20 mmol/L.

5. The method according to claim 1, wherein $CO_3^{2-}$ is introduced into the first liquid phase by adding a water-soluble carbonate to the first liquid phase, wherein the water-soluble carbonate is selected from alkali carbonate, ammonium carbonate, and mixtures thereof.

6. The method according to claim 1, wherein the content of silicon in the first liquid phase is 50 mg/L or more, and the method further comprises introducing $Ca^{2+}$ into the first liquid phase.

7. The method according to claim 1, wherein the amount of $Ca^{2+}$ in the first liquid phase is 0.1-10 mmol/L.

8. The method according to claim 1, wherein $Ca^{2+}$ is introduced into the first liquid phase by adding one or more selected from calcium sulfate, calcium chloride, calcium hydroxide, and calcium oxide into the first liquid phase.

9. The method according to claim 1, wherein, in Step (3), the pH value of the first liquid phase is adjusted to 8-11.

10. The method according to claim 1, wherein, in Step (3), the pH value of the first liquid phase is regulated by adding alkali into the first liquid phase, and the alkali is one or more selected from calcium hydroxide, sodium hydroxide, and ammonia water.

11. The method according to claim 1, wherein, in Step (5), the electrodialysis treatment at least comprises a triple-chamber bipolar membrane electrodialysis so that the second liquid phase is separated into an acid liquor, an alkali liquor and desalted water through electrodialysis;
   the second liquid phase is subjected to electrodialysis in the common electrodialysis to produce a concentrate and a first desalted water; the concentrate enters the bipolar membrane electrodialysis for a bipolar membrane electrodialysis, from which an acid liquor, an alkali liquor and a second desalted water are produced.

12. The method according to claim 1, wherein the silicon-containing wastewater is selected from the first liquid phase, the second liquid phase a waste liquid produced in a washing step, and an ion exchange waste liquid produced in an ion exchange step in the preparation of a molecular sieve, and mixtures thereof.

13. The method according to claim 1, wherein the content of silicon in the silicon-containing wastewater is 10-15000 mg/L.

14. The method according to claim 1, wherein the molecular sieve is a Y molecular sieve, an X molecular sieve, an A molecular sieve, an MCM molecular sieve, a ZSM molecular sieve, a mordenite molecular sieve, a beta molecular sieve, or a titanium silicalite molecular sieve.

15. The method according to claim 1, wherein an ion exchange membrane used in the electrodialysis treatment is a styrene-type homogeneous ion exchange membrane.

16. A method for the utilization of a silicon-containing wastewater generated during preparation of a molecular sieve, comprising:
   treating the silicon-containing wastewater according to the method of claim 1;
   using the silicon-containing solid phase obtained in step (2) as a raw material for synthesizing the molecular sieve;
   using at least a part of the second liquid phase obtained in step (4) as a washing water in a washing process to wash the molecular sieve;

using the acid liquor obtained in step (5) as an ion exchange liquid in an ion exchange process of the molecular sieve; and using the alkali liquor obtained in step (5) as an alkali source in synthesizing the molecular sieve.

17. The method according to claim 16, further comprising using the desalted water produced in step (5) as the washing water in synthesizing the molecular sieve and/or the washing process of the molecular sieve.

18. A method for the preparation of a molecular sieve, comprising a synthesis step, a crystallization step, a separation step, a washing step, a wastewater recovery, and recycling step, and an optional ion exchange step, wherein, in the synthesis step, a silicon source and, an alkali source, an optional aluminum source, and an optional titanium source are mixed in water to form a reaction mixture;

wherein, in the crystallization step, the reaction mixture from the synthesis step is crystallized;

wherein, in the separation step, a mixture obtained from the crystallization step is subjected to a solid-liquid separation to produce a solid phase and a liquid phase;

wherein, in the washing step, the solid phase obtained from the separation step is washed with a washing water to obtain a molecular sieve and a washing wastewater;

wherein, in the ion exchange step, the molecular sieve is contacted with an ion exchange liquid for carrying out the solid-liquid separation after an ion exchange to produce an ion exchanged molecular sieve and an ion exchange waste liquid;

in the wastewater recovery and recycling step, wastewater is collected and treated using the method according to the method of claim 1, wherein the wastewater is the liquid phase in the separation step, the washing wastewater in the washing step, and/or the ion exchange waste liquid in the ion exchange step.

19. The method according to claim 18, wherein a part of the silicon source in the synthesis step comes from the silicon-containing solid phase produced in the wastewater recovery and recycling step.

20. The method according to claim 18, wherein a part of the alkali source in the synthesis step comes from the alkali liquor produced in the wastewater recovery and recycling step.

21. The method according to claim 18, wherein a part of the washing water in the separation and washing step comes from the second liquid phase and/or the desalted water produced in the wastewater recovery and recycling step.

22. The method according to claim 18, wherein the ion exchange liquid in the ion exchange step is an acid liquor, and a part of the acid liquor comes from the acid liquor produced in the wastewater recovery and recycling step.

23. The method according to claim 18, wherein at least a part of the water used in the synthesis step comes from the desalted water produced in the wastewater recovery and recycling step.

24. A molecular sieve preparation system, comprising a synthesis unit, a crystallization unit, a separation unit, a washing unit, a wastewater recovery and recycling unit, and an optional ion exchange unit, wherein the synthesis unit is used for contacting a silicon source and an alkali source as well as an optional aluminum source and an optional titanium source in water for reaction;

the crystallization unit is used for crystallizing a mixture from the synthesis unit;

the separation unit is used for carrying out a solid-liquid separation on the mixture obtained from the crystallization unit to produce a liquid phase and a solid phase; and the produced liquid phase is delivered into the wastewater recovery and recycling unit as wastewater;

in the washing unit, the solid phase obtained from the separation unit is washed with a washing water to produce a molecular sieve and washing wastewater; and the washing wastewater is delivered into the wastewater recovery and recycling unit as wastewater;

the ion exchange unit is used for contacting the molecular sieve obtained from the washing unit with the ion exchange liquid to carry out an ion exchange, from which an ion exchanged molecular sieve and an ion exchange waste liquid are obtained; and the ion exchange waste liquid is delivered into the wastewater recovery and recycling unit;

the wastewater recovery and recycling unit is used for treating wastewater; the wastewater recovery and recycling unit includes a first precipitation reaction unit, a first solid-liquid separation unit, a second precipitation reaction unit, a second solid-liquid separation unit, and an electrodialysis unit;

the first precipitation reaction unit is used for contacting the wastewater with at least one acid or at least one alkali so that the silicon in the wastewater forms a colloid; and a mixture containing a colloid is thus obtained;

the first solid-liquid separation unit is used for carrying out a solid-liquid separation on the mixture containing a colloid obtained from the first precipitation reaction unit; and a silicon-containing solid phase and a first liquid phase are thus obtained;

the second precipitation reaction unit is used for regulating the pH value of the first liquid phase to 8 or more and introducing $CO_3^{2-}$ and/or $Ca^{2+}$ into the first liquid phase so that at least a part of the metal elements in the first liquid phase form a precipitate;

the second solid-liquid separation unit is used for carrying out a solid-liquid separation on the mixture obtained from the second precipitation reaction unit to obtain a solid phase and a second liquid phase;

the electrodialysis unit is used to carrying out an electrodialysis, which is a common electrodialysis and a bipolar membrane electrodialysis as connected in series, on at least a part of the second liquid phase to produce an acid liquor, an alkali liquor and/or desalted water.

25. The system according to claim 24, wherein the wastewater recovery and recycling unit further includes one of the following pipelines or combinations of two or more of the following pipelines:

a solid phase material delivery pipeline for delivering the silicon-containing solid phase into the synthesis unit as a silicon source;

a liquid phase material delivery pipeline for delivering at least a part of the second liquid phase into the washing unit as the washing water;

an acid liquid delivery pipeline for delivering at least a part of the acid liquor into the ion exchange unit as the ion exchange liquid;

an alkali liquid material delivery pipeline for delivering at least a part of the alkali liquor into the synthesis unit as an alkali source;

a desalted water delivery pipeline for delivering at least a part of the desalted water into the synthesis unit as water for synthesis.

26. The method according to claim 11, wherein the second liquid phase is subject to electrodialysis in the common electrodialysis to produce a concentrate and a first desalted water, and the concentrate enters the bipolar membrane electrodialysis to produce an acid liquor, an alkali liquor, and a second desalted water.

* * * * *